(12) United States Patent
Skipper et al.

(10) Patent No.: US 7,121,393 B1
(45) Date of Patent: Oct. 17, 2006

(54) SEGMENTED SYNCHRONIZER CLUTCH

(75) Inventors: Gary I. Skipper, South Wales (GB); Keith Roberts, South Wales (GB)

(73) Assignee: BorgWarner Inc., Auburn Hills, MI (US)

( * ) Notice: Subject to any disclaimer, the term of this patent is extended or adjusted under 35 U.S.C. 154(b) by 91 days.

(21) Appl. No.: 10/913,193

(22) Filed: Aug. 6, 2004

(30) Foreign Application Priority Data

Aug. 11, 2003 (GB) .................................. 0318805.9
Jul. 6, 2004 (EP) .................................. 04254048

(51) Int. Cl.
*F16D 13/16* (2006.01)
*F16D 13/26* (2006.01)

(52) U.S. Cl. ................. 192/48.91; 192/66.2; 192/66.23

(58) Field of Classification Search .............. 192/66.2, 192/66.21, 66.22, 66.23; 188/70 R, 70 B
See application file for complete search history.

(56) References Cited

U.S. PATENT DOCUMENTS

| | | | | |
|---|---|---|---|---|
| 482,788 | A | * | 9/1892 | Davis ....................... 192/66.23 |
| 1,266,189 | A | * | 5/1918 | Younie ..................... 192/66.21 |
| 1,686,226 | A | * | 10/1928 | Conkling De Witt ......... 192/65 |
| 3,203,525 | A | * | 8/1965 | Herbst ..................... 192/48.91 |
| 3,366,208 | A | | 1/1968 | Kelbel |
| 3,412,803 | A | * | 11/1968 | Stachowiak ................ 166/134 |
| 4,212,379 | A | * | 7/1980 | Zoino ....................... 192/66.22 |
| 5,105,927 | A | * | 4/1992 | Frost ....................... 192/53.31 |
| 5,269,400 | A | | 12/1993 | Fogelberg |
| 5,620,075 | A | | 4/1997 | Larsen et al. |
| 5,845,754 | A | | 12/1998 | Weilant |
| 6,814,682 | B1 | | 11/2004 | Spitale |

FOREIGN PATENT DOCUMENTS

| | | |
|---|---|---|
| EP | 0 756 098 A1 | 1/1997 |
| EP | 1 199 489 A1 | 4/2002 |
| EP | 1 201 952 A1 | 5/2002 |

OTHER PUBLICATIONS

Derwent English Abstract of EP 1 199 489 A1.
Derwent English Abstract of EP 1 201 952 A1.

* cited by examiner

*Primary Examiner*—Rodney H. Bonck
(74) *Attorney, Agent, or Firm*—Brinks Hofer Gilson & Lione; Greg Dzieglielewski

(57) ABSTRACT

A synchronizer clutch assembly includes a clutch hub which is axially movably mounted on a shaft, a gear which is axially spaced from the hub and which is journally mounted on the shaft and rotatable independent thereof, one of the hub or the gear having a conical friction surface formed thereon, and a synchronizer ring positioned between the hub and the gear. The synchronizer ring is coupled to the hub or the gear for rotation therewith and has a complementary conical friction surface formed thereon which is engageable with the conical friction surface on the hub or the gear. The synchronizer ring is composed of a plurality of separate arcuate segments arranged in a ring, which are movable between a first expanded configuration and a second, contracted configuration.

19 Claims, 6 Drawing Sheets

SEGMENTED SYNCHRONIZER CLUTCH

BACKGROUND OF THE INVENTION

The present invention relates to automotive transmissions and more particularly to synchronizer clutches for controlling changes in transmission gearing.

Synchronizer clutch assemblies are used to facilitate the smooth engagement of meshing teeth during changes of gears in a transmission. A typical assembly includes a hub positioned between two gears of different pitch diameter, the hub having a central opening in which are formed a plurality of teeth for drivingly mounting the hub on a drive shaft. A clutch sleeve with internal clutch teeth is mounted for axial sliding movement on the hub, and each gear also carries corresponding external sleeve teeth which are engageable by the inner teeth of the sleeve in order to create a drive path from the shaft, through the hub and sleeve to the gear. Each gear also carries an external cone clutch surface which is engageable by a complementary internal cone clutch surface formed on a synchronizer ring disposed between the hub and each gear. Upon movement of the sleeve towards a gear, the associated synchronizer rings are first engaged and caused to move axially towards the gear so as to bring its internal cone surface into engagement with the external surface formed on the gear. The resulting frictional engagement ensures that the speeds of the hub and gear are synchronized before the sleeve is slide further into engagement with the sleeve teeth of the gear, thereby ensuring smooth engagement. Examples of such synchronizers are shown in European Patent no. 0756098, U.S. Pat. No. 2,221,900 and U.S. Pat. No. 3,366,208.

These conventional synchronizers have the disadvantage, however, that if the cone surfaces on the gear and the synchronizer ring are formed with taper angles that are too small, that is, which are shallower than the friction angles determined by the material dependent frictional $\mu$ factors, then cone jam occurs, in which the frictional forces between the synchronizer ring and the gear are so great as to prevent disengagement of the two parts and hence jam the transmission in gear.

SUMMARY OF THE INVENTION

According to the present invention there is provided a clutch hub assembly which, in use, is non-rotatably but axially movably mounted on a torque delivery shaft, at least one gear assembly which is axially spaced from the hub assembly and which, in use, is journal mounted on the shaft so as to be rotatable independent thereof, one of the hub assembly and the at least one gear assembly having a conical friction surface formed thereon, at least one synchronizer ring positioned between the hub assembly and the at least one gear assembly, the or each synchronizer ring being coupled to the other of the hub assembly and the at least one gear assembly for rotation therewith and having a complementary conical friction surface formed thereon which is engageable with the conical friction surface of the one of the hub assembly and the at least one gear assembly in order create a drive coupling therebetween, characterized in that the or each synchronizer ring is composed of a plurality of separate arcuate segments arranged in a ring, which segments are movable between a first expanded configuration in which the synchronizer ring has a first radius and a second contracted configuration in which the ring has a second radius, movement of the hub assembly towards the at least one gear assembly urging the segments of the or each synchronizer ring, into one of said first and second configurations so that the conical friction surface of the ring is pressed against the friction surface of the one or the hub assembly and the gear assembly, thereby drivingly coupling the hub assembly to the at least one gear assembly.

The present invention further provides a synchronizer ring for a synchronizer clutch assembly according to the invention, comprising a plurality of separate arcuate segments arranged to form a closed ring, each segment including a friction surface which together form a conical friction surface for the synchronizer ring.

A synchronizer clutch assembly according to the invention and a synchronizer ring therefore has the advantage that it simplifies transmission synchronization by eliminating the need for a separate synchronizer ring, sleeve struts and drive teeth and all the functional variables associated with these separate components. Furthermore, the segmented synchronizer ring eliminates the possibility of cone jam occurring during disengagement of a gear, thereby enabling cone angles to be used which are much smaller than has been possible with conventional synchronizer systems and hence allowing cone torque to be increased.

The elimination of dog teeth on the synchronizer ring also simplifies the structure of the assembly and the associated manufacturing costs and also makes engagement much smoother.

In the preferred embodiment, the conical friction surface of the one of the hub and the gear is formed as an external cone surface which is engaged by an internal friction cone surface formed on the synchronizer ring, biasing means being associated with the segments of the ring which urge them into their expanded configuration. This has the advantage that, upon release of the engagement force from the hub, the segments will automatically lift off from the friction surface of the hub/gear, thereby ensuring reliable disengagement of drive through the gear. Movement of the hub towards the gear then causes the segments to be pressed towards their contracted configuration and into engagement with the friction surface against the biasing load of the biasing means. The biasing means particularly advantageously takes the form of a plurality of segment springs which are positioned between adjacent segments and urges them circumferentially apart. Each segment is, then, advantageously formed with a recess in each circumferential end for location of the segment springs.

In an alternative embodiment not shown, the one of the hub and the gear is formed with an internal friction cone surface which is engaged by an external cone surface formed on the synchronizer ring, the segments being urged into their expanded configuration upon movement of the hub towards the gear so as to frictionally engage the cone and effect a drive coupling between the hub and the gear. A spring band member may also then be provided around the segments, for example, housed within a circumferential groove formed in the segments which urges them into their contracted configuration upon movement of the hub away from the gear.

In one embodiment, the gear is formed with a first internal friction cone surface and a second external cone surface, the assembly including a first segmented synchronizer ring associated with the first cone surface, which first ring has an external cone surface formed thereon, and a second segmented synchronizer ring associated with the second cone surface, which second ring has an internal cone surface formed thereon, movement of the hub towards the gear urging the segments of the first synchronizer ring radially outward into engagement with the first cone surface of the gear and urging the segments of the second synchronizer ring radially inwards into engagement with the second cone surface of the gear. In this way, the torque capacity of the clutch is significantly increased in a manner which has not been possible with conventional assemblies due to the high risk of friction locking.

In one further embodiment, the conical friction surface is formed on the gear and the synchronizer ring is housed within the hub. However, the reverse configuration, with the conical friction surface or surfaces being formed as the hub may also be used.

Drive coupling between the or each synchronizer ring and the other of the hub and the gear is preferably effected by means of a plurality of radial tabs formed on the segments which engage radial pockets formed in the other of the hub and the gear. This arrangement provides a reliable coupling between the hub which is also easy to assemble. The relative radial extent of the tabs and pockets should be such that engagement is maintained in both the expanded and the contracted configurations of the segments.

Further objects and advantages of the present invention will become apparent by reference to the following description of the preferred embodiment and appended drawings wherein like reference numbers refer to the same component, element, or feature.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE PREFERRED AND ALTERNATE EMBODIMENTS

Figure 2:
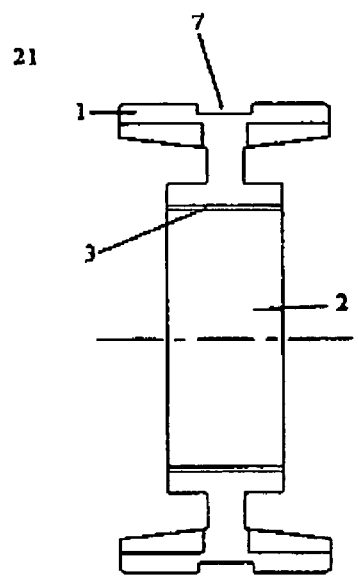
FIG. 2 is a sectional side view of a hub which forms part of the assembly of FIG. 1.
Figure 1:
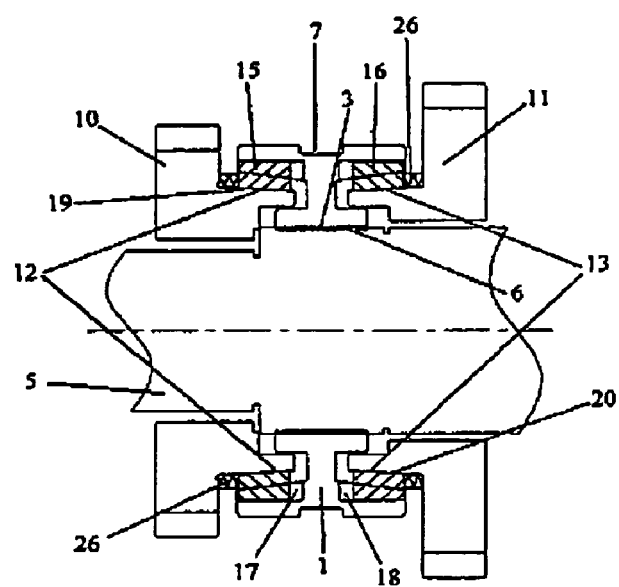
FIG. 1 is a sectional side view of a synchronizer assembly of a first embodiment of the invention.
Figure 3:
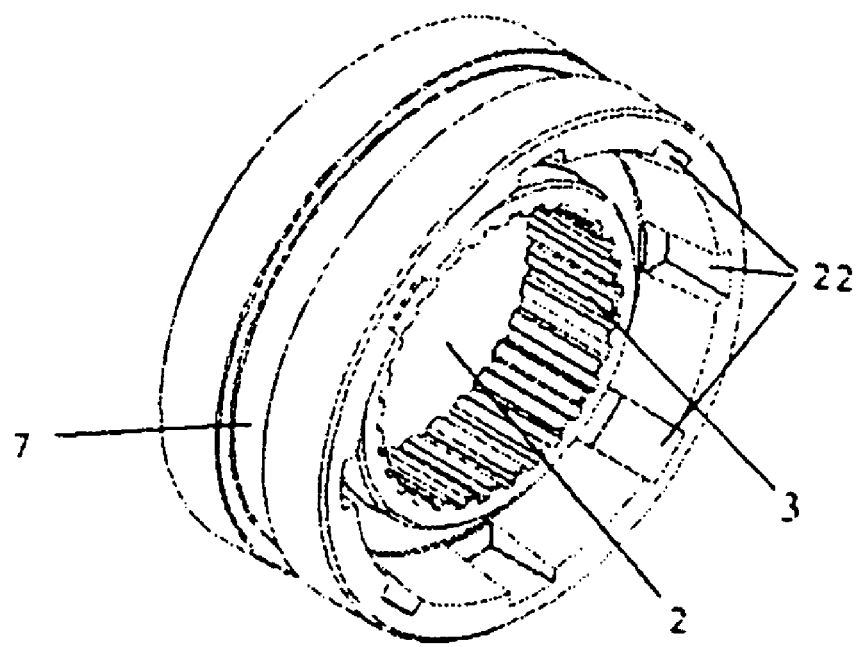
FIG. 3 is a perspective view of the hub of FIG. 2.

Referring first to FIGS. 1 and 2, there is shown a sectional side view of a bi-directional segmented synchronizing clutch assembly according to the invention. The assembly includes a hub 1 having a central opening 2 on the inner circumferential surface of which is formed a plurality of teeth 3 as shown more clearly in FIG. 3. A shaft member 5 extends through said opening 2 in the hub 1 and has a plurality of external splines or teeth 6 which engage with the teeth 3 of said opening 2 so that the hub 2 is secured to and rotates with the shaft 5 whilst permitting axially movement of the hub 1 along the shaft. Such axial movement of the hub 1 is effected by means of a linkage arm (not shown) which engages a circumferential groove 7 formed in the outer surface of the hub 1 and may be achieved manually, hydraulically, electronically, electro-magnetically or by any other well known means.

The hub 1 is positioned on the shaft 5 between a pair of gears 10, 11 having different gear ratios. In the assembly shown in FIG. 1, the left hand gear 10 is a large pitch diameter gear and the right hand gear 11 is a small pitch diameter gear. Each gear 10, 11 is journally mounted on the shaft 5 so as to be rotatable about the longitudinal axis of the shaft independent thereof and each meshes with an associated second gear (not shown) which is, in turn, drivingly mounted on a second shaft (not shown) for transmitting drive between each of the gears 10, 11 and the second shaft.

Each gear 10, 11 is further formed with a circumferentially extending conical friction surface 12, 13 on its side facing the hub 1, which surface tapers inwardly towards the hub 1 as shown in FIG. 1. Synchronizer rings 15, 16 are positioned in axially extending recesses 17, 18 formed in opposite sides of the hub 1 and the inner circumferential surface 19, 20 of each ring 15, 16 is formed as an internal cone clutch surface having an angle of inclination corresponding to the angle of the corresponding cones surfaces 12, 13 of the gears 10, 11. The inner surfaces 19, 20 of the rings 15, 16 may also be covered with friction members (not shown) which are well known in the art. The matching contact angles on the cone surface of the gears 10, 11 and the synchronizer rings 15, 16 are calculated from the μ factor of the construction material used to achieve ease of cone disengagement.

Figure 8:
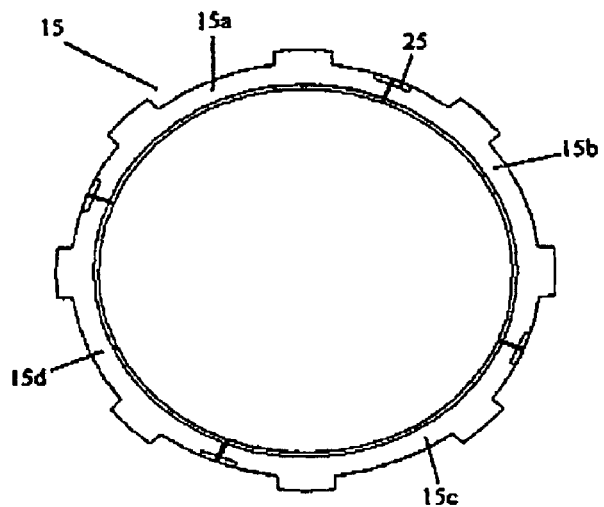
FIG. 8 is an end view of the segmented synchronizer ring.
Figure 4:
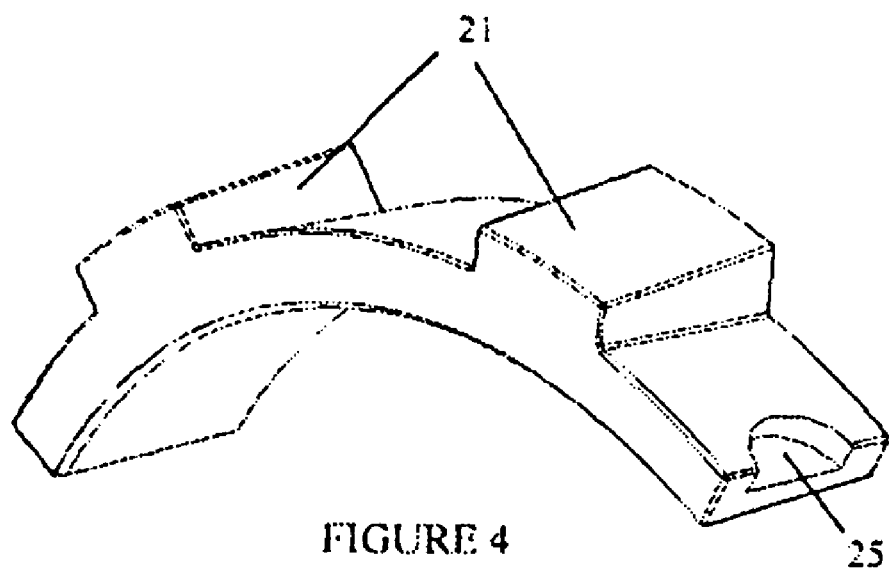
FIG. 4 is a perspective view of a segment of a synchronizer ring which forms part of the present invention.
Figure 5:
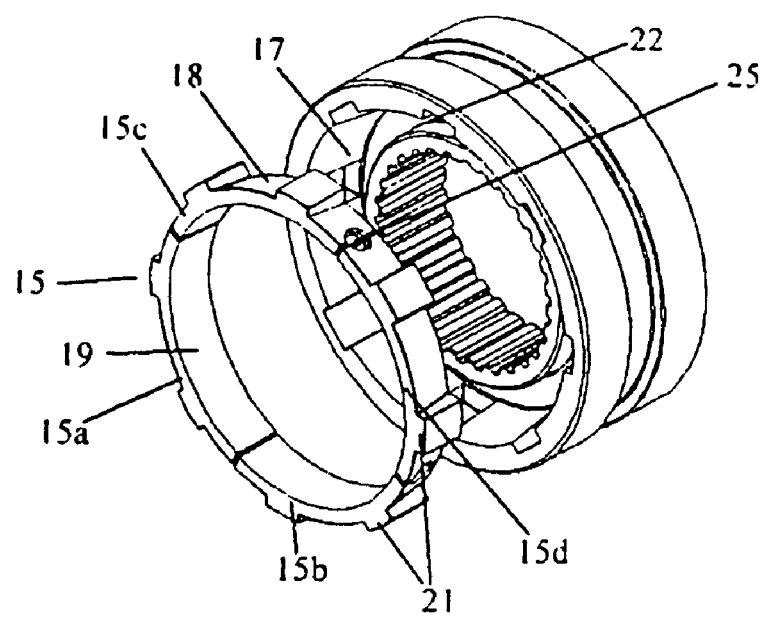
FIG. 5 is an exploded perspective view of the hub and synchronizer ring.
Figure 6:
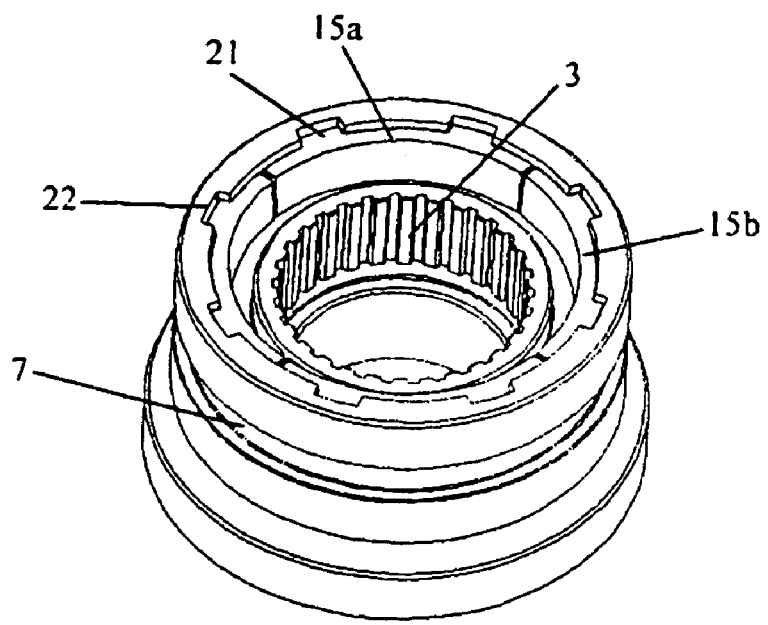
FIG. 6 is an end view of the hub of FIG. 2 with the segmented synchronizer ring mounted therein.
Figure 9:
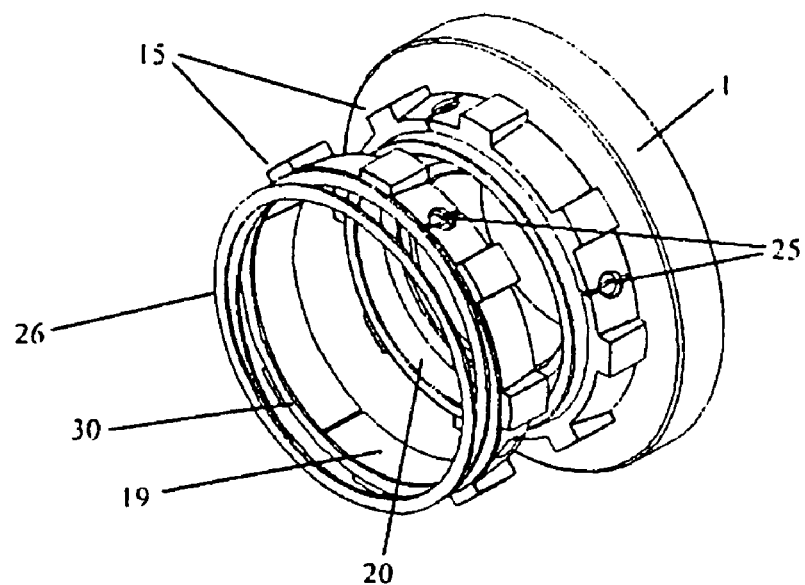
FIG. 9 is a cut away view of the assembled synchronizer rings and release springs.
Figure 7:
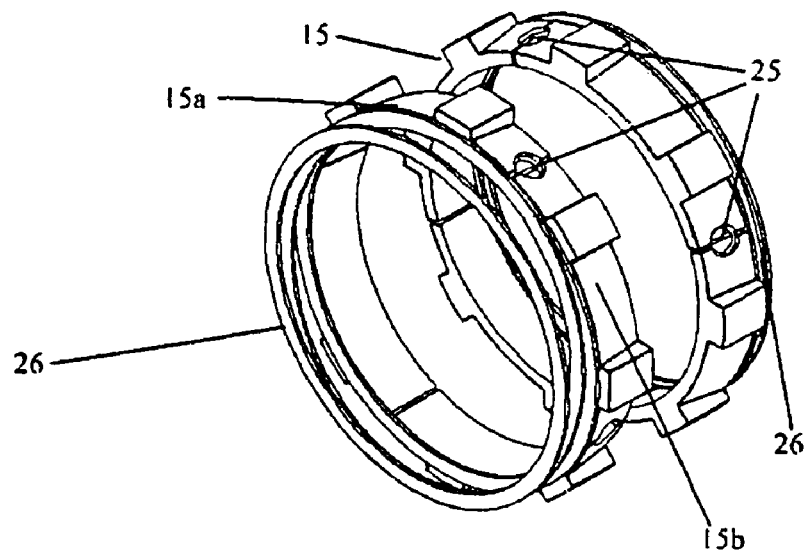
FIG. 7 is a perspective, cut away view of left and right segmented synchronizer rings with associated release springs.

As more clearly shown in FIGS. 5 and 8, each ring 15, 16 is formed from a plurality of individual arcuate segments 15a, 15b, 15c, 15d, which are arranged circumferentially to form a closed segmented synchronizer ring 15. One such segment is shown in FIG. 4. In the illustrated embodiment, the ring 15 is formed from four identical segments which each subtend an angle of substantially 90 degrees. However, it will be understood that more or fewer segments may be used and that the segments may be of differing circumferential extents. Each segment furthermore includes a plurality of radially extending tabs 21 on its outer circumferential surface which engage complementary shaped pockets 22 formed in the inner circumferential surface of each opening 17, 18 of the hub 1 so as to couple the segments to the hub 1 to prevent relative rotational movement therebetween. Camming surfaces (not shown) are also provided in the openings 17, 18 in the hub 1 which press the segments towards the gear cone 12, 13 upon movement of the hub 1 towards the gear 10, 11, and a separating spring 25 is positioned between adjacent segments 15a, 15b which urges the segments apart and hence biases the segmented ring 15, 16 into an expanded configuration in which it adopts its maximum possible radial size. The extent of this expansion is limited by the relative radial sizes of the segmented rings 15, 16 and the recesses 17, 18 in the hub 1 in which they are housed.

The camming action may be developed between the outer surfaces of the tabs 21 and the inner surfaces of the pockets 22 in the openings 17,18, or may be developed between the outer surfaces of the portions of the segments extending between the tabs 21 and the corresponding portions of the openings 17,18.

Furthermore, the separating springs 25 may be housed within recesses in the surface of the segments as shown or may take the form of compression springs which are housed in circumferentially extending bores formed in the mating circumferential faces of the segments.

A return spring 26 is also positioned around the conical friction surface 12, 13 of each gear 10, 11, between each gear 10, 11 and its associated synchronizer ring 15, 16, each return spring 26 engaging the front axial face of the associated synchronizing ring 15, 16 and urging it away from the gear, towards the hub 1, and hence out of engagement with the conical friction surface of the gears 10, 11. Due to the speed differential between the gears 10, 11 and the hub 1 before synchronization commences, a spring plate 30 is positioned between the segments and each return spring 26 so as to provide a true running surface.

The assembly operates as follows:

In the neutral position, the hub 1 is positioned mid-way between the two gears 10, 11 in which position the biasing force of the return springs 26 associated with the gears 10, 11 is balanced. The separating springs positioned between the segments of each synchronizer ring 15, 16 bias the segments apart and cause the rings 15, 16 to expand radially to their maximum permissible size, thereby ensuring that the inner surfaces 19, 20 of the synchronizer rings 15, 16 are fully disengaged from the conical friction surfaces 12, 13 of the gears 10, 11 and hence that the hub 1 and shaft 5 are free to rotate together independently of each of the gears 10, 11.

In order to engage the large pitch diameter gear 10, the hub 1 is moved axially on the shaft 5 towards the gear 10 by operation of the linkage arm, against the loading of the return spring 26. As the hub 1 moves along the shaft 5, the segments 15a, 15b, 15c, 15d of the synchronizer ring 15 are initially moved axially towards the gear 10 by the engagement drive due to the engagement of the inner axial faces of the tabs 21 with the axial end faces of the recesses 22 of the hub 1, until the inner cone surface 19 of the synchronizer ring 15 makes contact with the outer cone surface 12 of the gear 10 and begins to synchronize the speed of the two parts. At this stage, the frictional contact between the two cone surfaces inhibits the further axial movement of the segments and the engagement force on the hub 1 causes the segments to be pressed firmly against and eventually locked onto the gear cone 12, thereby achieving the drive coupling between the hub 1 and the gear 10. Since the drive coupling is effected only by means of the frictional engagement between the two cone surfaces, synchronization is achieved automatically through slippage between the friction surfaces during the initial engagements.

In order to disengage the drive to the gear, the hub 1 is moved axially away from the gear 10, releasing the engagement pressure of the synchronizer ring cone surface 19 on the gear friction surface 12. The return spring 26 is then free to urge the ring segments 15a, 15b, 15c, 15d axially away from the gear 10, thereby disengaging them from the cone surface 12 of the gear 10 and hence breaking the drive linkage between the shaft and the gear 10. Once the engagement pressure of the hub 1 on the segments is removed, it is impossible for so called cone-lock to occur, that is for the segments 15a, 15b, 15c, 15d to remain locked on the gear cone, since the action of the separating spring 25 urges the individual segments of the synchronizer ring 15 apart, thereby ensuring that segments 15a, 15b, 15c, 15d lift off of the cone face 12 of the gear 10 so as to break the frictional engagement therebetween and hence that there is no impediment to the return spring 26 moving the segments with the hub 1 to the neutral position. Reliable disengagement of the gear 10 is thereby ensured for all cone angles, and the radial gap between the synchronizer rings 15, 16 and the cone surfaces 12, 13 of the gears resulting from the expansion of the rings when in their neutral position ensure drag is eliminated whilst enabling lubrication of the friction material to take place.

Engagement and disengagement of the small pitch diameter gear is achieved in a similar fashion, with the separating springs 26 on the free running gear side of the hub 1 ensuring that the synchronizer ring on that side is kept clear of the cone surface of that gear.

Although in the above described embodiment the gears carry the conical friction surface and the segments of the synchronizer ring are housed in and permanently non-rotatably coupled to the hub, it will, of course, be understood that the present invention also allows this configuration to be reversed so that the hub is provided with a conical friction surface associated with each gear and each synchronizer is non-rotatably coupled to a gear, movement of the hub towards one of the gear causing the synchronizer ring mounted to that gear frictionally to engage the friction surface of the hub and hence to drivingly couple the hub to the gear.

Figure 10:
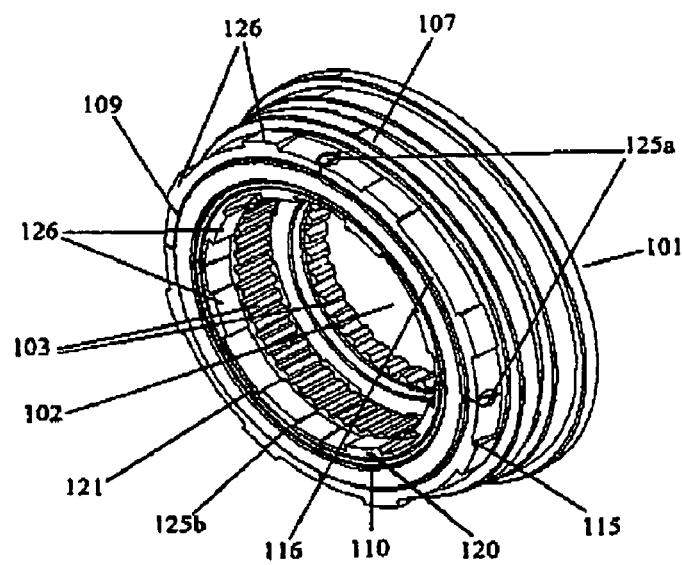
FIG. 10 is a perspective view of a hub and synchronizer ring assembly according to a second embodiment of the invention in which each side of the hub is provided with a pair of segmented synchronizer rings.
Figure 11:
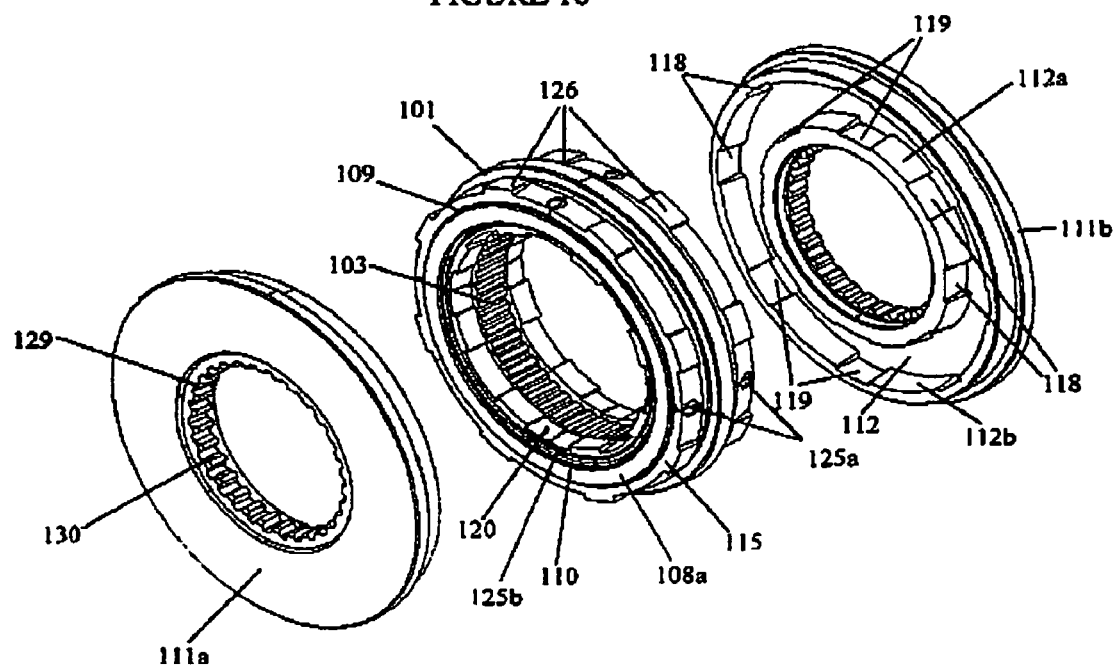
FIG. 11 is an exploded view of the clutch hub assembly of FIG. 10 with mating synchronizer engagement plates.
Figure 12:
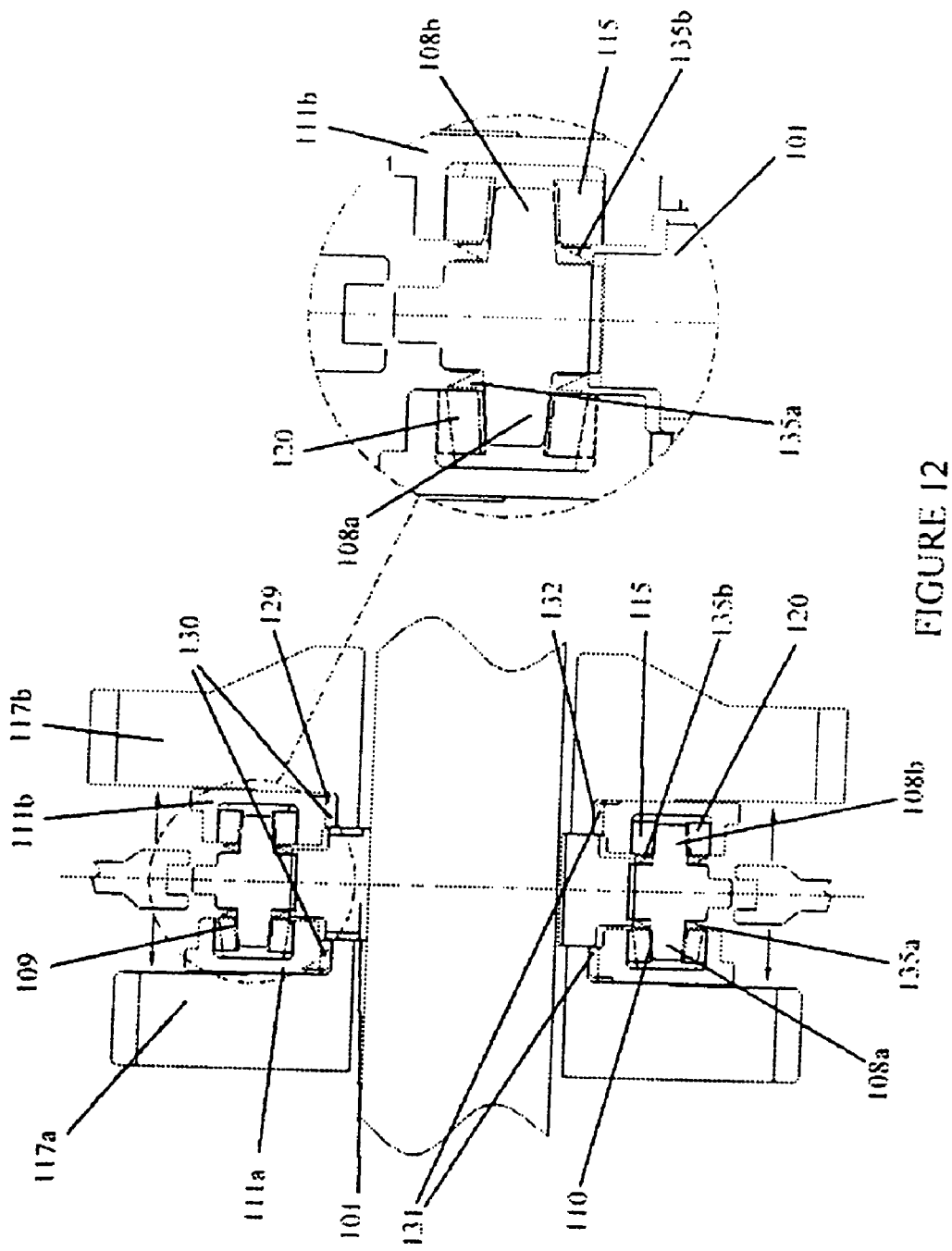
FIG. 12 is a sectional side view of a synchronizer assembly according to a second embodiment of the invention.

Referring now to FIGS. 10 to 12, there is shown a second embodiment of the invention. The hub 101 of this embodiment again has a central opening 102 for mounting onto a drive shaft and splines 103 formed on the surface of the opening 102 for non-rotatably but axially slidably mounting the hub 101 to the shaft. The hub 101 has a tapering annular axial extension 108a, 108b formed on each side, the outer annular surface 109 of which tapers radially inwardly as it extends away from the hub 101 so as to form an outer frustoconical friction surface 109 and the inner annular surface 110 of which tapers radially outwardly in a direction away from the hub 101 so as to form an inner frustoconical friction surface 110.

A first outer segmented synchronizer ring 115 is arranged around the outer frustoconical surface 109 of the hub 101, the outer segmented ring 115 having an inner frustoconical friction surface formed thereon which, upon contraction of the ring 115, engages the outer friction surface 109 of the hub 101 so as to effect a drive coupling therewith. A second inner segmented synchronizer ring 120 is positioned radially inwardly of an inner frustoconical friction surface 110 of the hub 101, the inner segmented ring 120 having an outer frustoconical friction surface 121 formed thereon which, upon radial expansion of the inner ring 120, engages with the inner frustoconical friction surface 110 of the hub 101 so as to effect a drive coupling therewith. Separating springs 125a are provided between the segments of the outer ring 115 which operate to urge the segments radially apart and hence bias the first outer ring 115 into a de-energized position, whilst suitable compliant restraining means such as a spring clip 125b extends around the segments of the inner synchronizer ring 120 so as to urge the segments thereof radially inward into engagement with each other and hence bias the inner ring 120 also into a de-energized position. Each of the segments of the inner and outer rings 120, 115 also have radial tabs 126 formed on the radial surface opposite the friction surface, the tabs 126 of the outer ring 115 extending radially outwardly from the outer surface of the segments and the tabs 126 of the inner ring 120 extending radially inward from the inner surface of the segments.

An engagement plate 111a, 111b is provided on each side of the hub 101, each plate 111a,111b being non-rotatably mounted on its associated gear and having an annular recess 112 formed in its side facing the hub 101 in which the facing annular extension 108a, 108b, of the hub 101 engages. The inner and outer radial surfaces 112a and 112b of the recess 112 have pockets 119 formed therein in which the tabs 126 of the synchronizer rings 115,120 engage so as to non-rotatably couple the synchronizer rings 115,120 to the engagement plate 111a. The height of the tabs 126 and depth of the pockets 119 are such that the tabs 126 remain engaged in the pockets 119 and hence the rings 115,120 remain coupled to the plate 111a as each ring moves between its expanded and its contacted configuration. The relative dimensions of the engagement plate 111a, the hub 101 and the drive shaft are such that the engagement plate 111a does not interfere with rotation of the drive shaft whilst the inner and outer surfaces 112a and 112b of the recess 112 limit respectively the maximum expansion and contraction of the outer and inner synchronizer rings 115,120 and hence maintains the segments in place around the friction surfaces formed on the hub 101.

As illustrated in FIGS. 11 and 12, the engagement plates 111a,111b are formed separately from the gears and have splines 130 formed on their inner circumferential surface 129 which engage with complementary shaped splines 131 formed on an outer circumferential surface 132 of each gear so as non-rotatably to lock each engagement plate 111a, 111b to its associated gear 117a, 117b, this arrangement having the advantage of simplifying manufacture and assembly of the clutch. However, the skilled person will understand that each engagement plate may alternatively be integrally formed with its associated gear.

At least one of the pockets 119 formed in the recess 112 of each engagement plate 111a, 111b and the tabs 126 of the synchronizer rings 115, 120 are formed with camming surfaces such that, upon movement of the hub 101 towards one of the gears 117a, 117b, interaction of the tabs 126 with the bottom of the pockets 119 develops a camming action which urges the tabs 126 out of the pockets 119 and hence presses the segments into engagement with the associated friction surface 109, 110 of the hub 101 in similar manner to the embodiment of FIGS. 1 to 9. In this way, as the hub 101 is pressed towards one of the gears, both the inner ring 120 and the outer ring 115 simultaneously engage opposite sides of the annular axial extension 108 of the hub 101, producing a particularly effective synchronizing load whilst minimizing stresses in the axial extension 108 due to the engagement forces being balanced. Alternatively, the camming action may be developed between the sections of the segments extending between the tabs 126 and the corresponding surfaces of the recesses 112.

Upon releasing the axial engagement load from the hub 101 in order to disengage drive through the engaged gear, thereby removing the cam loading on the segments, if there is any cone lock between the segments and the hub 101, the segments will initially move axially with the hub 101 away from their associated gear into a position in which there is a radial clearance between the inner and outer segments 120, 115 and the associated plate 111a, 111b. The biasing force exerted on the outer ring 115 by the separating springs 125a located between the outer segments will then cause the outer ring 115 to expand, disengaging it from the outer cone surface of the hub 101 so as to break the drive coupling therethrough. Similarly, the biasing force exerted on the inner ring 120 by the spring clip 125b provided around the segments of the inner ring 120 will then cause the inner ring 120 to contract into the radial clearance, disengaging it from the inner cone surface of the hub 101 and hence breaking the drive coupling through the inner ring 120. If there is no cone lock between the inner and outer rings 120, 115 and the cone of the hub 101, the friction surfaces 109, 110 of the hub 101 will simply retract from between the inner and outer rings 120, 115 leaving the segments axially unmoved.

In the embodiment illustrated in FIG. 12, outer and inner release springs 135a, 135b, preferably in the form of wave of plate springs, are provided between the inner and outer rings 120, 115 respectively and the hub 101, which operate to urge the segments axially towards their associated engagement plate 111a, 111b. In this way, in the case when the segments initially move axially with the hub 101 due to cone lock, once released, they will move back towards the engagement plate 111a, 111b under the action of the release spring 135a, 135b, thereby maintaining the maximum separation between the segments and the cone surfaces of the hub 101 when the hub 101 is disengaged. It will, however, be understood that in some circumstances, the release springs 135a, 135b may be positioned on the other side of the synchronizer rings so as to urge the segments away from the engagement plates 11a, 11b into positions in which they can expand/retract away from the cone surfaces of the hub 101. Furthermore, the release spring may, in some configurations, be omitted completely. It will, of course, be understood that in all configurations the relative angles of the engaging camming surfaces must be such that no friction lock can occur between the segments and the engagement plates 111a, 111b, which might prevent disengagement.

Although the above embodiment has been described with the annular recess 112 formed in the engagement plates 111a, 111b and the annular axial extension upon which the inner and outer friction surfaces are carried formed on the hub 101, it will, of course, be understood that the invention may also operate with the reverse configuration, i.e. with the or each conical friction surface formed on the gear or engagement plate and the pockets in which the tabs of the synchronizer rings engage formed in the hub 101.

Furthermore, in an embodiment which is not illustrated, a single segmented synchronizer ring having an outer conical friction surface may be associated with each gear, that single friction ring operating in a similar manner to the internal synchronizer ring of the embodiment of FIGS. 10 to 12 during engagement and disengagement of drive through the gear.

Although the invention has been described in connection with synchronizer rings for clutches, it will be understood by the skilled reader that the segmented ring of the invention has wider application in any field in which a rotational friction drive coupling is required where cone lock might be a problem, and also may be utilized where rotational frictional engagement is used as a means for arresting motion, such as in a braking system.

The present invention therefore further provides a friction coupling assembly comprising a first member having at least one conical friction surface formed thereon, a second member having a segmented ring non-rotatably coupled thereto, the segmented ring having a friction surface formed thereon which is engageable with the conical friction surface of the first member, and being movable between a first expanded configuration in which the ring has a first radius and a second contracted configuration in which the ring has a second radius smaller than said first radius, at least one of said first and second members being rotatable, whereby actuation of the assembly, in particular upon movement of one of said first and second members towards said other of said first and second members, said ring is urged into one of said expanded and contracted configurations such that said friction surface is pressed against the conical friction surface of the first member so as to frictionally couple said first and second members.

One of the members may be rotationally fixed such that, upon actuation, a rotation arresting force is applied to the other member, the members, for example, forming part of a vehicle braking system. Alternatively, both members may be rotatable, the segmented ring providing a drive coupling between members. The system may also have applications in torque drive systems and devices, during acceleration or declaration, or in any other drive coupling or drive assisting system which utilized a friction coupling.

It will further be understood that all developments and variants described above in connection with the synchronizer clutch embodiment of the invention are also applicable to the other possible applications for the friction coupling assembly.

We claim:

1. A synchronizer clutch assembly comprising a clutch hub assembly non-rotatably but axially movably mounted on a torque delivery shaft, at least one gear assembly axially spaced from the hub assembly and journally mounted on the shaft so as to be rotatable independent thereof, one of the hub assembly and the at least one gear assembly having a conical friction surface formed thereon, at least one synchronizer ring positioned between the hub assembly and the at least one gear assembly, the or each synchronizer ring being housed within an annular recess formed in the other of the hub assembly and the at least one gear assembly and coupled to the other of the hub assembly and the at least one gear assembly for rotation therewith and having a complementary conical friction surface formed thereon which is engageable with the conical friction surface of the one of the hub assembly and the at least one gear assembly in order create a drive coupling therebetween, characterized in that the or each synchronizer ring is composed of a plurality of separate arcuate segments arranged in a ring, and movable between a first expanded configuration in which the synchronizer ring has a first radius and a second contracted configuration in which the ring has a second radius and having biasing means associated with the or each synchronizer ring which urges said segments into the other of said first and second configurations in which the conical friction surface of the or each ring is disengaged from the friction surface of the one of the hub assembly and the gear assembly, movement of the hub assembly towards the at least one gear assembly urging the segments of the or each synchronizer ring, into one of said first and second configurations so that the conical friction surface of the ring is pressed against the friction surface of the one or the hub assembly and the gear assembly, thereby drivingly coupling the hub assembly to the at least one gear assembly.

2. A synchronizer clutch assembly according to claim 1, wherein each segment includes a plurality of radial tabs which engage complementarily shaped pockets formed in the other of the hub assembly and the gear assembly so as to non-rotatably couple the segments thereto.

3. A synchronizer clutch assembly according to claim 1, wherein the one of the hub assembly and the gear assembly has an external conical friction surface formed therein which is engageable by an internal conical friction surface formed on the at least one synchronizer ring, the other of the hub assembly and the gear assembly co-operating with the or each synchronizer ring to press said segments radially inwardly towards their second contracted configuration and into engagement with said external friction surface upon axial movement of the hub assembly towards the gear assembly.

4. A synchronizer clutch assembly according to claim 3, wherein said biasing means urges said segments into their first, expanded configuration.

5. A synchronizer clutch assembly according to claim 3, wherein the other of the hub assembly and the gear assembly limits the radial expansion of the synchronizer ring.

6. A synchronizer clutch assembly according to claim 3, wherein the other of the hub assembly and the gear assembly includes inclined surfaces which engage with the segments and urge them toward their contracted configuration upon axial movement of the hub assembly toward the gear assembly.

7. A synchronizer clutch assembly according to claim 1, wherein said biasing means comprises a separating spring positioned between adjacent ring segments which urges said segments apart circumferentially.

8. A synchronizer clutch according to claim 1, wherein the one of the hub assembly and the gear assembly has an internal friction surface formed thereon which is engageable by an external conical friction surface formed on the at least one synchronizer ring, the other of the hub assembly and the gear assembly co-operating with said at least one synchronizer ring to press said segments thereof radially outwardly towards their first expanded configuration and into engagement with said internal friction surface upon axial movement of the hub assembly towards the gear assembly.

9. A synchronizer clutch according to claim 8, wherein said biasing means urges said segments of said at least one synchronizer ring into their second contracted configuration.

10. A synchronizer clutch assembly according to claim 8, wherein the other of the hub assembly and the gear assembly includes inclined surfaces which engage with the segments to urge them toward their expanded configuration upon axial movement of the hub assembly toward the gear assembly.

11. A synchronizer clutch according to claim 1, wherein said biasing means comprises a spring clip which extends around the outside of the segments and urges them radially inward.

12. A synchronizer clutch assembly according to claim 1, wherein the other of the hub assembly and the gear assembly limits the radial contraction of said at least one synchronizer ring.

13. A synchronizer clutch assembly according to claim 1, wherein a return spring is provided between the one of the hub assembly and the or each gear assembly and the synchronizer ring which urges the synchronizer ring axially away from said one of the hub assembly and the or each gear assembly.

14. A synchronizer clutch assembly according to claim 13, wherein the return spring is a compression spring.

15. A synchronizer clutch assembly according to claim 13, wherein a spring plate is located between the return spring and the synchronizer ring.

16. A synchronizer clutch assembly according to claim 1, wherein the hub assembly has a central through opening in which are formed a plurality of teeth which, engage with splines formed on the outer surface of the shaft to rotatably couple the hub assembly to the shaft.

17. A synchronizer clutch assembly according to claim 1, further including a second gear assembly which is journal mounted on the shaft, the hub assembly being position between the first and the second gear assemblies and having a second synchronizer ring positioned between the hub assembly and the second gear assembly.

18. A synchronizer clutch assembly according to claim 1, wherein a pair of segmented synchronizer clutch rings are coupled to the other of the hub assembly and the or each gear assembly for rotation therewith, one of said rings having an internal conical friction surface for engagement with a complementary external friction surface formed on the one of the hub assembly and the at least one gear assembly and the other of said rings having an external conical friction surface for engagement with a complementary internal friction surface formed on the one of the hub assemblies and the at least one gear assembly, whereby the drive coupling between said hub assembly and the or each gear assembly is effected through both of said pair of rings simultaneously.

19. A synchronizer clutch assembly comprising a clutch hub assembly non-rotatably but axially movably mounted on a torque delivery shaft, at least one gear assembly axially spaced from the hub assembly and journally mounted on the shaft so as to be rotatable independent thereof, one of the hub assembly and the at least one gear assembly having a conical friction surface formed thereon, at least one synchronizer ring positioned between the hub assembly and the at least one gear assembly, the or each synchronizer ring being coupled to the other of the hub assembly and the at least one gear assembly for rotation therewith and having a complementary conical friction surface formed thereon which is engageable with the conical friction surface of the one of the hub assembly and the at least one gear assembly in order create a drive coupling therebetween, characterized in that the or each synchronizer ring is composed of a plurality of separate arcuate segments each including a plurality of radial tabs which engaged complementarily shaped pockets formed in the other of the hub assembly and the gear assembly so as to non-rotatably couple the segments together, said segments arranged in a ring, and movable between a first expanded configuration in which the synchronizer ring has a first radius and a second contracted configuration in which the ring has a second radius and having biasing means associated with the or each synchronizer ring which urges said segments into the other of said first and second configurations in which the conical friction surface of the or each ring is disengaged from the friction surface of the one of the hub assembly and the gear assembly, movement of the hub assembly towards the at least one gear assembly urging the segments of the or each synchronizer ring, into one of said first and second configurations so that the conical friction surface of the ring is pressed against the friction surface of the one or the hub assembly and the gear assembly, thereby drivingly coupling the hub assembly to the at least one gear assembly.

* * * * *